Nov. 22, 1966 W. J. ACHRAMOWICZ 3,287,650

PULSE TRAIN GENERATOR EMPLOYING TRIGGERED SELF-RECIRCULATING PULSE-CIRCUIT AND COUNTER PRODUCING SYNCHRONIZABLE BUT INDEPENDENT OUTPUT PULSE-TRAIN OF SELECTABLE LENGTH

Filed Jan. 29, 1964 2 Sheets-Sheet 1

INVENTOR.
WILLIAM J. ACHRAMOWICZ
BY Wade Koontz
George Fine
ATTORNEYS

Nov. 22, 1966 W. J. ACHRAMOWICZ 3,287,650

PULSE TRAIN GENERATOR EMPLOYING TRIGGERED SELF-RECIRCULATING PULSE-CIRCUIT AND COUNTER PRODUCING SYNCHRONIZABLE BUT INDEPENDENT OUTPUT PULSE-TRAIN OF SELECTABLE LENGTH

Filed Jan. 29, 1964 2 Sheets-Sheet 2

INVENTOR.
WILLIAM J. ACHRAMOWICZ
BY Wade Koontz
George Fine
ATTORNEYS

United States Patent Office 3,287,650

Patented Nov. 22, 1966

3,287,650

PULSE TRAIN GENERATOR EMPLOYING TRIGGERED SELF-RECIRCULATING PULSE-CIRCUIT AND COUNTER PRODUCING SYNCHRONIZABLE BUT INDEPENDENT OUTPUT PULSE-TRAIN OF SELECTABLE LENGTH

William J. Achramowicz, Cherry Valley, Mass., assignor to the United States of America as represented by the Secretary of the Air Force Filed Jan. 29, 1964, Ser. No. 341,142

5 Claims. (Cl. 328—63)

The invention described herein may be manufactured and used by or for the United States Government for governmental purposes without payment to me of any royalty thereon.

This invention relates to pulse generators, and more particularly to a pulse train generating circuit where a single input pulse is used to initiate a regenerative action to generate any number of pulses, at any pulse repetition rate.

Digital techniques utilizing pulse trains usually derive their pulses from a master clock, which may be an oscillator whose waveform is processed to the desired waveshape; a gated amplifier may then be used to gate out the required number of pulses forming the pulse train. While this method of generating a pulse train has the advantages of simplicity, reliability, an ease of synchronization, its use is restricted to a system which operates at the clock frequency, or submultiple of the clock frequency. In the event that the system requires a chain of pulses at a frequency which cannot be derived from the system clock, a separate clock must be used, together with complex synchronizing circuitry.

The present invention is concerned with a network which can provide a train of pulses in a digital system independent of the clock frequency, which can easily be synchronized with the clock frequency, and which is compatible with the digital elements of the particular system.

It is, accordingly, one object of the present invention to generate a pulse train which can be easily synchronized with a digital system.

It is another object of this invention to provide an electric pulse network which is compatible with the basic elements of a digital system.

A further object of the invention is to provide means whereby a series of pulses are generated for each input pulse applied to the network.

For a more complete understanding of the present invention, reference should be had to the following specifications and to the appended drawings of which:

Figure 1:
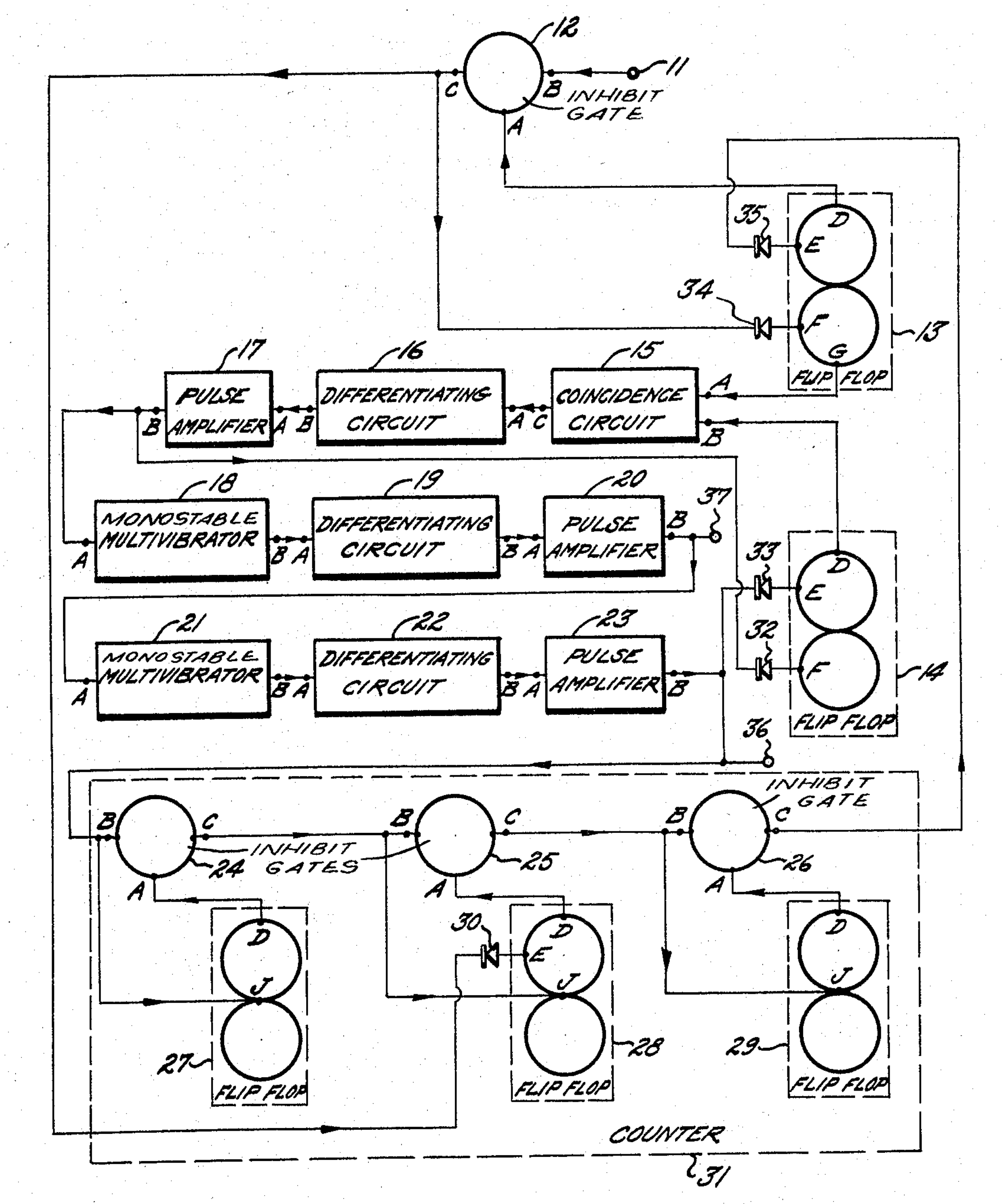
FIG. 1 is a simplified block diagram of a preferred embodiment.

In FIG. 1, pulse input terminal 11 is connected to input terminal B of gated amplifier 12; a D.-C. enabling level from terminal D of flip-flop 13 is connected to enabling terminal A of gated amplifier 12; pulse output terminal C of gated amplifier 12 is connected through diode 34 to terminal F, a pulse input terminal of flip-flop 13, and also through diode 30 to terminal E of flip-flop 28 in counter 31.

Counter 31 is a conventional binary counter made up of flip-flops and gated amplifiers. In the counter chain, the D.-C. enable voltage from terminal D of flip-flops 27, 28, and 29 is connected to the enable terminal A of gated amplifiers 24, 25, 26; pulse input terminal B of these gated amplifiers is connected to the complementary input terminal J of each flip-flop. The output pulse terminal C of gated amplifier 24 is connected to input terminal B of gated amplifier 25, as is terminal C of amplifier 25 to terminal B of amplifier 26. Terminal C of gated amplifier 26 is the output terminal of counter 31, which is connected through diode 35 to terminal E of flip-flop 13.

D.-C. enable voltages are applied to terminals A and B of coincidence circuit 15 from terminals G and D of flip-flops 13 and 14, respectively. Output terminal C of coincidence circuit 15 is connected to input terminal A of differentiating circuit 16, at the output terminal B of which is connected input terminal A of pulse amplifier 17; the output terminal B of the pulse amplifier is connected through diode 32 to terminal F of flip-flop 14, and also the input terminal A of monostable multivibrator 18; the output of the multivibrator is connected through differentiating circuit 19 to pulse amplifier 20 to terminal 37, which is one output of the pulse train circuit. The output of pulse amplifier 20 is fed through another series chain of monostable multivibrator 21, differentiating circuit 22, and pulse amplifier 23; the output terminal 36 of pulse amplifier 23 is the main output terminal of the circuit, which is connected to terminal B of gated amplifier 24, and also through diode 33 to terminal E of flip-flop 14.

In the following description of the operation of this circuit, the terminology used is as follows: a flip-flop refers to a bistable multivibrator which can exist indefinitely in either of two stable states and can be caused to make an abrupt transition from one state to the other upon application of a pulse to either terminals E, F, or J; the "high" or the enable side of a flip-flop refers to terminals D or G which are at —6-volt potential; the "low" or "disable" side refers to these terminals when they are at 0 volt potential. The pulse input terminals of a flip-flop are at E, F, and J; a pulse applied at terminal E of a flip-flop will cause terminal D to switch to —6 volts, unless terminal D is initially at —6 volts, in which case no change will occur in the state of the flip-flop. A pulse applied at terminal F will cause terminal G to switch to —6 volts, unless terminal G is at the —6-volt potential initially. Terminal J is the complementary pulse input terminal of the flip-flop; a pulse applied at terminal J will cause the flip-flop to change state regardless of the state of the flip-flop.

In the gated amplifier, the pulse input terminal is at B, the pulse output terminal is at C, while a voltage enable level from a flip-flop is applied at terminal A. An enable voltage of —6 volts applied at terminal A will allow passage of a pulse through the amplifier, while a disable voltage of 0 volt at terminal A will prevent any pulse from passing through the amplifier. Negative pulses of .5 microsecond pulse width, and of 5-volt amplitude are used throughout the network.

The monostable multivibrator has one permanently stable state and one quasi-stable state; a triggering pulse applied at the input causes an abrupt transition from the stable state to the quasi-stable state, which in the following description, lasts for 11 milliseconds; the monostable multivibrator then returns from the quasi-stable state to its stable state very suddenly, with no external signal required to induce the change.

For purposes of explanation of the operation of the circuit, assume that it is required to generate 6 negative pulses, spaced 22 milliseconds apart, from a single initiating pulse. The operation of the circuit will then be as follows.

Terminal D of flip-flops 13 and 14 are initially at −6 volts, while terminal D of flip-flops 27, 28, and 29 are at 0 volt. Gated amplifier 12 is therefore enabled, so that when an external pulse is applied at terminal 11 at time $t_1$, (11, FIG. 1) it passes through the amplifier and switches flip-flop 28 of the counter chain to preset the counter to count to the desired number, in this case, 6. This pulse also switches flip-flop 13 so that terminal G switches from 0 to −6 volts; this output, and the output from terminal D of flip-flop 14, are applied to coincidence circuit 15, causing terminal C to switch from 0 to −6 volts; this change of state is differentiated by differentiating circuit 16 and amplified by pulse amplifier 17 to provide a negative pulse which is used to switch terminal D of flip-flop 14 to zero and trigger the monostable multivibrator 18 into its unstable state, which lasts for 11 milliseconds; the output of the multivibrator is differentiated by differentiating circuit 19 and amplified by pulse amplifier 20 so that 11 milliseconds after the initiating pulse appears at terminal 11, a negative pulse appears at terminal 37; this pulse is used to trigger monostable multivibrator 21, the output of which is differentiated by differentiating circuit 22 and amplified by pulse amplifier 23; this pulse, applied through diode 33 to terminal E of flip-flop 14, will cause terminal D, which was at 0 volt, to switch to −6 volts; since terminal G of flip-flop 13 is still at −6 volts, the negative going output of pin D of flip-flop 14, applied to coincidence circuit 15, causes a repetition of the differentiating action of the output of the coincidence circuit, so that the two series multivibrators are again triggered, and terminal D of flip-flop 14 is again switched to zero volts, until the next pulse derived from multivibrator 21 again switches terminal D of flip-flop 14 to −6 volts 22 milliseconds later. Consequently, it can be seen that as long as terminal G of flip-flop 13 remains at −6 volts, this regenerative action will continue, and a series of negative pulses 22 milliseconds apart appear at terminal 36.

In order to obtain the 6 required pulses, a counter chain is used to count the 6 pulses and stop the regenerative action by removing the −6 volts of flip-flop 13, terminal G, from the input to coincidence circuit 15. The counter chain operates as follows: terminal D of flip-flops 27, 28, and 29 are initially at the disable level, so that the pattern of the counter chain at terminal D of flip-flops 27, 28, and 29, respectively, is 0, 0, 0; the initiating pulse applied at terminal 11 passes through amplifier 12 to preset flip-flop 28, causing the pattern of the counter at the start of each cycle to be 0, 1, 0. The first pulse from terminal 36 can only switch flip-flop 27, since gated amplifier 24 is disabled, causing the counter pattern to change to 1, 1, 0. The second pulse from terminal 36 22 milliseconds later finds gated amplifiers 24 and 25 enabled and passes through these amplifiers to switch flip-flop 29, but it cannot pass through gated amplifier 26, which is disabled; this pulse also switches flip-flops 27 and 28, so that the pattern after the second pulse becomes 0, 0, 1. In a similar manner, the third pulse changes the pattern to 1, 0, 1, the fourth pulse to 0, 1, 1, the fifth pulse to 1, 1, 1, until the final sixth pulse passes through each amplifier and switches each flip-flop to the initial pattern of 0, 0, 0; this pulse is applied through diode 35 to terminal E of flip-flop 13, causing terminal G of flip-flop 13 to switch to 0 volt, removing the −6 volts from coincidence circuit 15, and stopping the regenerative action of flip-flop 14, the coincidence circuit, and the two series multivibrators. The final counter pattern becomes 0, 0, 0, terminal D of flip-flops 13 and 14 become enabled, and the entire circuit is ready for the next cycle of operation. The waveforms at various terminals in the circuit are shown in FIG. 2.

Figure 2:
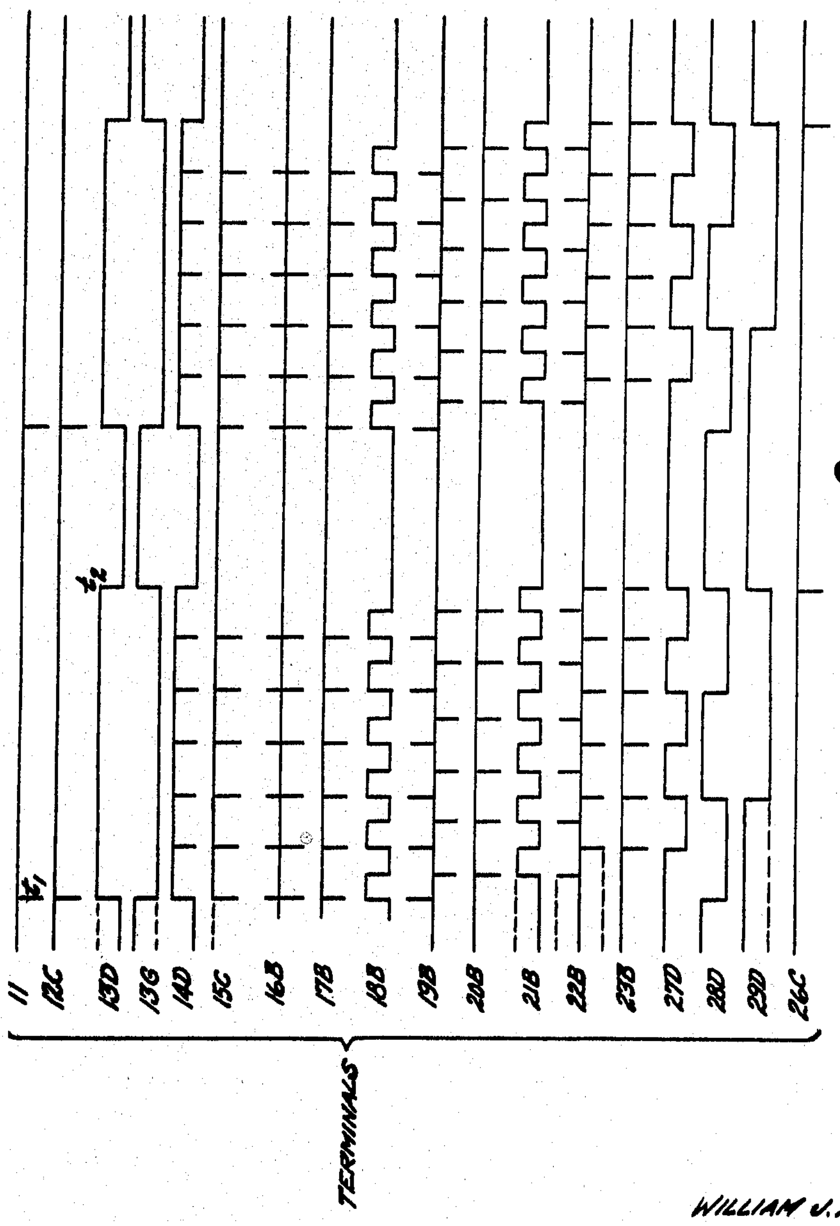
FIG. 2 is a series of waveforms found in various parts of the network of FIG. 1, useful in explaining the operation of the invention.

FIG. 2 shows that the pulse from gated amplifier 26 of counter 31 causes terminal G of flip-flop 13 to switch to zero volts at time $t_2$ at approximately the same time that terminal D of flip-flop 14 was being switched to zero by a pulse taken directly from pulse amplifier 23. If both flip-flops 13 and 14 had switched at exactly the same instant, there would be no conflict in switching times, since there would be no coincidence of voltages at the input to coincidence circuit 15, and thus there could be no output from terminal 15C and the regenerative action would have been halted after the desired number of pulses. If, however, flip-flop 13 was for some reason slow in switching, so that terminal 14D switched to −6 volts an instant before terminal 13G switched to zero, an extra pulse could be generated by the regenerative action; the solution would require that the pulse to diode 33 be delayed slightly, perhaps a microsecond, in order that terminal G of flip-flop 13 switches to zero before flip-flop 14 switches. A delay line between diode 33 and terminal 36 would correct this condition; also faster transistors in flip-flop 13 would aid in correcting the problem, as would presetting the counter chain to count to one less than the required number of pulses.

As seen in FIG. 1, two monostable multivibrators were used to derive a time delay. The only reason two multivibrators were used was to derive an optional pulse output at terminal 37, as shown in line 20B of FIG. 2. The first pulse of the pulse train at terminal 37 was delayed by 11 milliseconds with respect to the initiating pulse, with the following pulses spaced at the 22 milliseconds interval. A single monostable multivibrator could be used in place of the two multivibrators, with but a single output if only a single chain of pulses were required.

Lines 16B, 19B, and 22B of FIG. 2 show the output of the differentiating circuits of FIG. 1. Positive and negative pulses appear in the output and are fed to a pulse amplifier, but the positive pulses are prevented from passing through the amplifier by the diode action of the transistor of the pulse amplifier.

It is to be understood that the above-described networks and arrangement of component electric circuits are simply illustrative of the application of the principles of the invention and many other modifications may be made without departing from the invention.

What is claimed is:

1. Apparatus for generating a train of pulses, comprising a source of signal pulses, a gate circuit, first and second bistable multivibrators, said gate circuit being enabled by said first bistable multivibrator to allow a single source pulse to pass through and switch said first bistable multivibrator, disabling said gate circuit, and causing said first bistable multivibrator to switch to a coincident state with said second bistable multivibrator, means for deriving a pulse from the coincident output of said bistable multivibrators to switch said second bistable multivibrator from the coincident state, means for delaying said pulse and applying the delayed pulse to again switch said second bistable multivibrator into coincidence with said first bistable multivibrator thereby generating a series of pulses at the output of said delay circuit equally spaced at a predetermined interval, and means for counting said delayed pulses to provide a pulse output after a predetermined count to switch said first bistable multivibrator to its initial state and stopping the pulse generating action.

2. Apparatus as defined in claim 1 wherein the means for generating a pulse comprise a coincidence circuit, a differentiating circuit for deriving a pulse from the coincidence circuit output, and an amplifier.

3. Apparatus as defined in claim 1 wherein the means for delaying a pulse comprise a monostable multivibrator, a differentiating circuit, and an amplifier, said monostable multivibrator being triggered to its unstable state by the generated pulse to provide a waveform which is differentiated and amplified to produce a delay pulse.

4. Apparatus as defined in claim 1 wherein the means for delaying a pulse comprises a plurality of circuits as defined in claim 3 to provide a plurality of outputs.

5. Apparatus as defined in claim 1 wherein the counting means comprises a plurality of stages of a gate circuit enabled by a bistable multivibrator.

References Cited by the Examiner

UNITED STATES PATENTS

| | | | |
|---|---|---|---|
| 2,830,179 | 4/1958 | Stenning | 328—61 |
| 2,836,717 | 5/1958 | Sullivan | 328—61 |
| 3,014,181 | 12/1961 | Filipowsky | 328—63 |
| 3,054,072 | 9/1962 | Beaulieu et al. | 307—88.5/6 |
| 3,124,753 | 3/1964 | Gieseler | 328—63 |

ARTHUR GAUSS, *Primary Examiner.*

J. S. HEYMAN, *Assistant Examiner.*